United States Patent [19]

Masreliez

[11] Patent Number: 5,377,895
[45] Date of Patent: Jan. 3, 1995

[54] VACUUM ACTUATED SOLDER SUCKER

[76] Inventor: C. Johan Masreliez, 3301 - 181st Pl. Northeast, Redmond, Wash. 98052

[21] Appl. No.: 207,557

[22] Filed: Mar. 8, 1994

[51] Int. Cl.6 .............................................. B23K 3/00
[52] U.S. Cl. .................................... 228/20.5; 137/907
[58] Field of Search ......................... 228/20.5; 137/907

[56] References Cited

U.S. PATENT DOCUMENTS

| | | | |
|---|---|---|---|
| 3,980,218 | 9/1976 | Fortune | 228/20.5 |
| 4,056,334 | 11/1977 | Fortune | 228/20.5 |
| 5,076,322 | 12/1991 | Choksi et al. | 137/907 X |

*Primary Examiner*—Kenneth J. Ramsey
*Attorney, Agent, or Firm*—Seed and Berry

[57] ABSTRACT

A vacuum actuated solder sucker device having a body chamber in which a vacuum is created by a vacuum source attached thereto and a cover chamber separated from the body chamber by a piston. The piston drives a primary air valve which controls the passage of air through a passageway between the body chamber and a nozzle. In a first position the primary air valve permits the application of the vacuum to the nozzle portion, and in a second position the primary air valve permits the vacuum to be reestablished within the body chamber. The primary air valve is actuated by pressure differential across the piston which is controlled by a user who covers or uncovers a bleed hole. Air pressure equalizes between the body and cover chambers through a bleed tube through the piston. The nominal pressure of the cover chamber portion in one embodiment is controlled by an adjustable bleed valve which can restrict the maximum flow of air through the bleed hole.

13 Claims, 2 Drawing Sheets

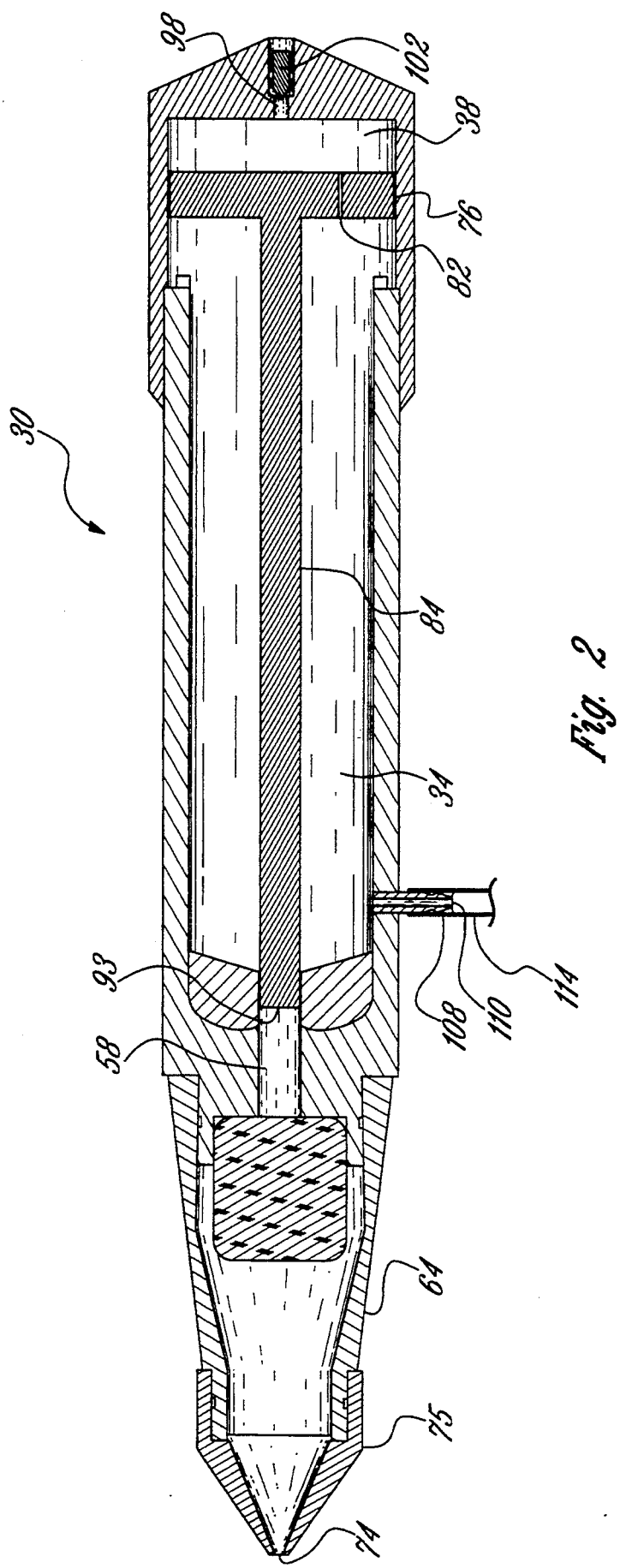

VACUUM ACTUATED SOLDER SUCKER

TECHNICAL FIELD

The present invention relates to the field of vacuum-type solder removal devices.

BACKGROUND OF THE INVENTION

In various applications, solder must be removed from objects. For example, when performing repairs of a printed circuit board having components soldered to the board, solder must be removed from component leads before a failed component can be removed.

One of the most common tools for solder removal is a solder sucker. One typical solder sucker consists of a cylinder terminating in a nozzle. A spring-loaded piston is positioned within the cylinder and held in place by a catch mechanism. When the catch mechanism is released the spring forces the piston to travel axially within the cylinder away from the nozzle. As the piston moves, a vacuum is created momentarily behind the nozzle. The created vacuum draws air in through the nozzle, creating suction.

Such solder suckers are typically used in conjunction with a heat source, such as a soldering iron. The soldering iron is applied to the solder to be removed thereby causing the solder to liquefy. The nozzle of the solder sucker then is applied to the molten solder and the catch mechanism is released allowing the piston to travel away from the nozzle. The suction created by the traveling piston draws the molten solder through the nozzle and away from the soldered object. While such devices may be produced fairly inexpensively, they require the piston spring to be compressed before each application, usually by forcing the piston to return to its original position. It can be difficult to apply the necessary force to the piston when performing a delicate repair, and doing so increases the period of time that potentially damaging heat must be applied to electronic components.

Other, more sophisticated, solder removal devices combine a heated tip containing a nozzle which melts the solder and an electrically-powered vacuum source. As the heated tip melts the solder, the vacuum source draws the solder through the nozzle and away from the object. Such devices tend to be costly due to their requirement of special tips and electrically-powered vacuum sources. In addition to their relatively high cost, such devices tend to clog, requiring frequent cleaning.

SUMMARY OF THE INVENTION

It is an object of the present invention to provide an efficient, inexpensive and easy-to-use solder removal device. In one embodiment, the device includes a central body having a body chamber therein with a nozzle coupled to the chamber through a passageway. Air flow through the passageway between the chamber and the nozzle is regulated by a primary air valve. A piston is coupled to the valve by a shaft with an end portion of the shaft forming part of the primary air valve. The piston segregates the chamber into a body chamber portion and a cover chamber portion. The primary air valve is actuated by controlling a pressure differential across the piston. A vacuum port on the housing provides access for a vacuum source to create a vacuum within the body chamber.

Control of the air pressure differential across the piston is achieved by means of a second valve positioned at a second end of the housing. In an open position the second valve permits the ingress of air into the cover chamber portion at atmospheric pressure, and in a closed position prevents the passage of air into the cover chamber portion. A bleed robe through the piston allows gradual equalization of air pressure between the body and cover air chambers when the second valve is closed, such that the air pressure differential across the piston is gradually reduced. When the air pressure differential across the piston is sufficiently small, atmospheric pressure on an end face oft he shaft through the passageway overcomes the force due to the air pressure differential and forces the piston and shaft to slide axially toward the secondary air valve. As the piston and shaft travel, the end portion of the shaft retracts from the passageway, opening the primary air valve. Upon the opening of the primary air valve, the air pressure differential between the atmospheric pressure in the nozzle and the pressure within the body chamber portion causes air to flow through the nozzle creating suction.

BRIEF DESCRIPTION OF THE DRAWINGS

FIG. 2 is a side cross-sectional view of the preferred embodiment of the device with the primary air valve open.

DETAILED DESCRIPTION OF THE INVENTION

Figure 1:
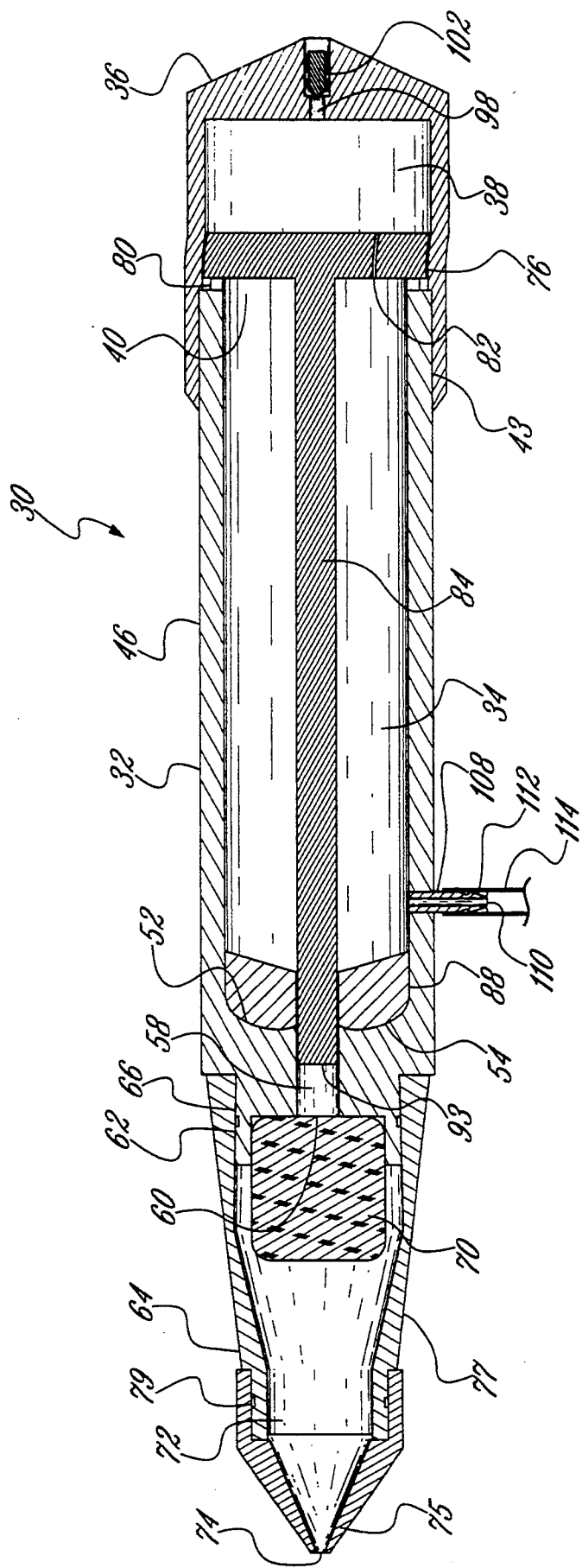
FIG. 1 is a side cross-sectional view of the preferred embodiment of the inventive device with the primary air valve closed.

As shown by FIG. 1, a solder sucker device 30 includes an elongated cylindrical body 32 having a body chamber 34 therein. An end cover 36 having a cover chamber 38 attaches to the body 32 at a first end 40 of the body 32 with the cover chamber 38 in alignment with the body chamber 34. The end cover 36 has a cylindrical outer wall 43 that surrounds the first end 40 of the body 32 and is bonded thereto by a suitable sealant 43.

A second end 52 of the cylindrical body 32 includes an end wall 54 having an axial air passage 58 therein. The air passage 58 extends to an air intake opening 60 in a cylindrical protruding portion 62 of the body 32. The air intake opening 60 is covered by a filter 70 attached to the inner wall of the surrounding protruding portion 62.

The filter 70 preferably is a porous material which covers the air intake opening 60, thereby permitting air to flow relatively unobstructed into the air intake opening 60 but preventing solids and/or liquids, such as molten solder and debris, from flowing easily into the air passage 58 through the air intake opening 60.

A nozzle section 64 is attached to the body 32 by bonding an overlapping portion 66 to an outer wall of the protruding portion 62. A nozzle passageway 72 having a nozzle opening 74 at its outer end is axially aligned with the air passage 58.

The nozzle section 64 advantageously includes two portions; a tip portion 75 and a central portion 77. The tip portion 75 is preferably of a high temperature plastic material or stainless steel which snaps onto an O-ring 79 surrounding the central portion 77. The tip portion 75 is advantageously detachable and inexpensive to replace. This permits the solder sucker device 30 to be returned to operating condition quickly and inexpensively if the tip portion 74 becomes clogged. The central portion 77 also snaps onto an O-ring and is detached to remove solder from inside the tip.

A piston 76 separates the body chamber 34 from the cover chamber 38 except for a narrow bleed tube 82 extending longitudinally through the piston 76. The diameter of the piston 76 is larger than the inside diameter of the outer wall 46 of the body 32, and an O-ring 80 is mounted against the end of the outer wall 46. As a result, the surface of the piston 76 contacts the O-ring 80 when the piston 76 is as shown in FIG. 1 to prevent movement of the piston 76 and substantially seal the body chamber 34 from the cover chamber 38. A shaft 84 connected to the piston 76 extends toward the air passage 58 and is maintained in axial alignment with the air passage 58 by a plurality of fins 88 which extend radially into the body chamber 34 from the inner wall of the cylindrical body 32. An end portion 93 of the shaft 84 slides within the air passage 58 in engagement with the wall of the air passage 58 to form a substantially airtight seal which prevents air from passing through the air passage 58.

A bleed hole 98 formed in the end of the end cover 36 communicates between the cover chamber 38 and the outside atmosphere. Airflow through the bleed hole 98 is controlled by a bleed valve 102, such as a needle set screw.

A cylindrical vacuum fitting 108 having a vacuum passage 110 therethrough is mounted to the body 32. The vacuum passage 110 extends through the outer wall 46 such that the vacuum passage 110 communicates with the body chamber 34. The vacuum port 108 preferably contains a tapered connector end 112 for attachment of a vacuum line 114. Such tapered connector ends are known in the art.

As explained in detail below, in one position (FIG. 1), the shaft 84 extends into the air passage 58 to block the air passage 58, and in another position, (FIG. 2), the shaft 84 is retracted out of the air passage 58 to allow air to flow through the passage 58. The air passage 58 and the end portion 93 of the shaft 84 thus effectively form a primary air valve responsive to the shaft which controls the passage: of air into the body chamber 34 from the nozzle section 64.

In operation, a vacuum line 114 is connected to the vacuum port 108. At its other end, the vacuum line 114 is connected to a vacuum source (not shown), as is known in the art. The vacuum line 114 draws air through the vacuum passage 110, creating a vacuum within the body chamber 34. It will be understood by those skilled in the art that the use of the term vacuum herein is intended to refer to pressure below atmospheric pressure, rather than being limited to a complete absence of air. When the piston 76 and shaft 84 are positioned as shown in FIG. 1, the shaft 84 blocks the air passage 58 to prevent air from the nozzle section 64 from entering the body chamber 34 to replace the air drawn by the vacuum source.

If, as shown in FIG. 1, the bleed hole 98 is uncovered, pressure within the cover chamber 38 will tend to be equal to atmospheric pressure outside of the solder sucker device 30. The piston 76 prevents air within the cover chamber 38 from entering quickly into the body chamber 34, although some air will bleed through the bleed robe 82. Because the bleed tube 82 is narrow, it will limit the rate of air flow from the cover chamber 38 into the body chamber 34, well below the air flow to the vacuum source. Thus, air loss through the bleed tube 82 will not prevent the pressure within the cover chamber 38 from being maintained below atmospheric pressure by the vacuum source applied to the vacuum port 112. The air pressure in the cover chamber 38 will then be greater than that in the body chamber 34, creating a pressure differential across the piston 76. The pressure differential will force the piston 76 toward the second end 52 of the body 32. This force retains the end portion 93 of the shaft 84 in the air passage 58 to prevent air from flowing into the body chamber 34 from the nozzle passageway 72.

If a user closes the bleed hole 98, typically by placing a finger over the bleed hole 98, the low flow of air flowing into the body chamber 34 from the cover chamber 38 through the bleed tube 82 will not be replaced by air from outside of the solder sucker device 30. The pressure within the cover chamber 38 will thus be reduced gradually as the air escapes through the bleed tube 82, and will approach the lower pressure of the body chamber 34. As a result, the pressure differential between the cover chamber 38 and the body chamber 34 is also reduced. When the air pressure differential across the piston 76 is sufficiently small, the force of atmospheric pressure on the end portion 93 of the shaft 84 forces the piston 76 and shaft 84 to slide axially away from the nozzle section 64.

As the piston 76 and shaft 84 slide, the end portion 93 of the shaft 84 exits the air passage 58, effectively opening the air passage 58. The pressure differential between atmospheric pressure within the nozzle section 64 and the reduced pressure within the body chamber 34 causes air to rush into the body chamber 34, causing a suction effect through the nozzle passageway 72 and creating suction at the nozzle opening 74. The result is a rapid pulse of suction at the nozzle opening 74.

A user de-energizes the solder sucker device 30 by unblocking the bleed hole 98, for example by removing a finger covering the bleed hole 98. Up until this point, the piston 76 and shaft 84 will be in the position shown in FIG. 2. After the bleed hole 98 is unblocked, air passes through the bleed hole 98 into the cover chamber 38 because of the pressure difference between the cover chamber 38 and the outside atmosphere. This causes the pressure within the cover chamber 38 to increase toward atmospheric pressure. The pressure within the body chamber 34 will be kept below atmospheric pressure by the continued application of vacuum at the vacuum port 108 by the vacuum source. As the pressure within the cover chamber 38 increases toward atmospheric pressure, the pressure differential across the piston 76 overcomes the pressure on the end portion 93 of the shaft 84 and the piston 76 and shaft 84 move toward the nozzle section 64.

When the piston 76 and shaft 84 slide a sufficient distance for the end portion 93 to enter the air passage 58, the air passage 58 is once again blocked and the vacuum within the body chamber 34 is then reestablished as described above. The device 30 can then be used for sucking solder by once again coveting the bleed hole 98.

In the preferred embodiment, the bleed valve 102 is advantageously adjustable to control the airflow through the bleed hole 98. The adjustable airflow through the bleed hole 98 permits the pressure differential across the piston 76 to be reduced when the bleed hole 98 is uncovered. The reduced pressure differential across the piston 76 reduces the volume of air necessary to be evacuated from the cover chamber 38 through the bleed tube 82 to trigger the device 30. Consequently, the device triggers more quickly after the bleed hole 98 is closed because the time delay caused by the limited flow of air through the bleed tube 82 is reduced. The invention is therefore described by the claims appended hereto and is not restricted to the embodiments shown herein.

I claim:

1. A vacuum type solder removal device comprising:
   a device body having a chamber formed therein;
   a nozzle attached to a first end of said device body;
   a piston axially slidable within said chamber, said piston separating said chamber into a body chamber and a cover chamber, thereby inhibiting air flow between said body chamber and said cover chamber;
   an air passage connecting said nozzle to said body chamber;
   a primary air valve controlling air flow through said air passage, such that in an open position said primary air valve permits air to flow between said nozzle and said body chamber and in a closed position said primary air valve inhibits air from flowing between said nozzle and said body chamber, said primary air valve being opened and closed in response to said piston sliding axially within said chamber;
   a vacuum port on said device body in communication with said body chamber for connection of a vacuum source to said chamber; and
   a secondary air valve controlling the pressure differential across said piston to selectively actuate said primary air valve to its open and closed positions.

2. The device of claim 1 wherein said piston is adapted to slide axially in response to an air pressure differential between said body chamber and said cover chamber.

3. The device of claim 2 wherein said secondary air valve includes an adjustable air passage.

4. The device of claim 2, further comprising a bleed tube extending between said body chamber and said cover chamber.

5. The device of claim 4 wherein said secondary air valve comprises a manually sealable opening.

6. The device of claim 4 wherein said manually sealable opening includes an adjustable air passage.

7. The device of claim 5 wherein said bleed hole comprises a passageway extending through said piston from said body chamber to said cover chamber.

8. The device of claim 1, further comprising a filter positioned adjacent said air passage to prevent the passage of solder from said nozzle into said air passage.

9. The device of claim 1 wherein said primary air valve comprises:
   an end portion of a shaft, said shaft being connected to said piston, said end portion, in a first position, slidably engaging sidewalls of said air passage and forming a seal thereby, and blocking the passage of air through said passageway, and in a second position, disengaging from the sidewalls and permitting the passage of air between said nozzle and said chamber.

10. The device of claim 9, further comprising a shaft guide, said shaft guide including a plurality of fins circumferentially engaging said shaft and extending radially toward the sidewall of said chamber, said shaft guide holding said shaft substantially in axial alignment with said passageway between said nozzle and said chamber.

11. The device of claim 10 wherein said manually sealable opening includes an adjustable air passage.

12. The device of claim 11 wherein said bleed hole comprises a passageway extending through said piston from said body chamber to said cover chamber.

13. The device of claim 12, further comprising a filter positioned adjacent said air passage to prevent the passage of solder from said nozzle into said air passage.

* * * * *